US012579513B2

(12) United States Patent
Levesque

(10) Patent No.: US 12,579,513 B2
(45) Date of Patent: Mar. 17, 2026

(54) DYNAMIC PRODUCTION BILL OF MATERIALS SYSTEM

(71) Applicant: Nimble Precision, Inc., Middletown, DE (US)

(72) Inventor: Alain P. Levesque, Deerfield Beach, FL (US)

(73) Assignee: Nimble Precision, Inc., Middletown, DE (US)

( * ) Notice: Subject to any disclaimer, the term of this patent is extended or adjusted under 35 U.S.C. 154(b) by 250 days.

(21) Appl. No.: 18/201,627

(22) Filed: May 24, 2023

(65) Prior Publication Data

US 2023/0419256 A1      Dec. 28, 2023

Related U.S. Application Data

(60) Provisional application No. 63/354,926, filed on Jun. 23, 2022.

(51) Int. Cl.
*G06Q 10/0875*      (2023.01)
(52) U.S. Cl.
CPC ................................ *G06Q 10/0875* (2013.01)
(58) Field of Classification Search
CPC .................................................. G06Q 10/0875
See application file for complete search history.

(56) References Cited

U.S. PATENT DOCUMENTS 7,962,512 B1      6/2011   Sholtis
2003/0009410 A1   1/2003   Ramankutty 2006/0047676 A1    3/2006   Ouchi
2006/0235771 A1*  10/2006   Oberoi ............... G06Q 20/3674
                                                            705/29
2007/0162171 A1*   7/2007   McDonald ......... G06Q 10/0875
                                                            700/106
2010/0268367 A1*  10/2010   Wu ...................... G06Q 10/087
                                                            700/121
2015/0262124 A1*   9/2015   Martinez-Ablanedo ....................
                                                            G06Q 10/06312
                                                            705/29
2020/0050174 A1    2/2020   Mcalvay
(Continued)

OTHER PUBLICATIONS

Shilovitsky, "How to Manage Serial Numbers and As-Built BOMs Using OpenBOM", Jun. 2021 https://www.openbom.com/blog/how-to-manage-serial-numbers-and-as-built-boms-using-openbom (Year: 2021).*

(Continued)

*Primary Examiner* — Allen C Chein
(74) *Attorney, Agent, or Firm* — Van Pelt, Yi & James LLP

(57)      ABSTRACT

An initial bill of materials and an alternative manufacturing list to assemble a printed circuit board are received. An intermediate bill of materials is generated and stored in a database. The intermediate bill of materials includes, for each of one or more components comprising the printed circuit board, one or more corresponding specifically-identified parts approved to be used for the one or more components. The intermediate bill of materials is updated to add one or more specifically-identified parts not included in the initial bill of materials or the alternative manufacturing list, based at least in part on a determination that a specifically-identified part listed in the initial bill of materials or the alternative manufacturing list is unavailable.

18 Claims, 10 Drawing Sheets

(56)              References Cited

U.S. PATENT DOCUMENTS

| 2020/0134745 | A1 | 4/2020 | Mclinden |
| 2021/0091952 | A1 | 3/2021 | Wentz |

OTHER PUBLICATIONS

Abhishekashish15 "Enterprise Resource Planning Blogs by Members", Feb. 2020 https://community.sap.com/t5/enterprise-resource-planning-blogs-by-members/concept-of-using-3-types-of-bill-of-material-sap-peo/ba-p/13434544 (Year: 2020).*

* cited by examiner

200

Client
Device ⟋ 201

Server ⟋ 211

221          223          225

Supplier₁          Supplier₂          ○ ○ ○          Supplierₙ

Database₁ ⟋ 231          Database₂ ⟋ 233          Databaseₙ ⟋ 235

Receive An Initial Bill of Materials ⟶ 252

Determine One Or More Available Components And One Or More Unavailable Components ⟶ 254

Determine One Or More Substitute Components For The One Or More Unavailable Components ⟶ 256

No

Yes

Approved? ⟶ 258

Yes

Generate and Store an Intermediate Bill of Materials ⟶ 260

A

250

300

Scan A Package That Includes A Component — 302

Associate the Component With The Bill of Materials — 304

Store the Component — 306

500

Determine Corresponding Storage Locations For A Plurality of Components Associated With The PCB — 502

Provide an Indication at the Corresponding Storage Locations For the Plurality of Components Associated With the PCB — 504

Obtain The Plurality Of Components Associated With The PCB — 506

Assemble the PCBA Using The Obtained Components — 508

600

Receive a Request to Assemble One or More Additional PCBAs — 602

Utilize A Stored Intermediate BOM to Identify One or More Available Components And/Or One Or More Unavailable Components — 604

Determine One Or More Substitute Components For The One Or More Unavailable Components — 606

No

Yes

Approved? — 608

Yes

Update The Intermediate Bill of Materials — 610

A

600

700

DYNAMIC PRODUCTION BILL OF MATERIALS SYSTEM

CROSS REFERENCE TO OTHER APPLICATIONS

This application claims priority to U.S. Provisional Patent Application No. 63/354,926 entitled DYNAMIC PRODUCTION BILL OF MATERIALS SYSTEM filed Jun. 23, 2022 which is incorporated herein by reference for all purposes.

BACKGROUND OF THE INVENTION

One of the most challenging aspects of printed circuit board assembly (PCBA) is keeping the Bill of Materials (BOM) for a product up to date. A BOM indicates a plurality of components associated with a PCB to be assembled, a reference designator that indicates where on the PCB a corresponding component is to be located, and a quantity of each component needed for the PCB. A customer may provide an alternative manufacture list (AML) that indicates pre-approved substitution component(s) that may be used in the event a component included in the BOM is unavailable.

The typical process to assemble a PCB begins with a customer submitting a BOM and ends with the PCB being assembled into a PCBA using a production BOM. The production BOM indicates the reference designator for each component that is being used to assemble the PCB. The assembly process is in an intermediate state until all the components needed to assemble the PCB have been ordered and received. Since the production BOM is meant to reflect what is to be built, the AML content is not carried forward in the file, making the production BOM inflexible to purchasing and inventory realities.

For example, the initial BOM may include an entry that indicates that a particular component having a manufacturing part number of "MPN1" is to be used for the particular component. The AML may include an entry that indicates that a component having a manufacturing part number of "MPN2" may be used as a substitute for the component having the manufacturing part number of "MPN1." The component having the manufacturing part number of "MPN1" may be unavailable and the component having the manufacturing part number of "MPN2" may be available. The production BOM is edited (e.g., overwritten) to indicate that the component having the manufacturing part number of "MPN2" is to be used for the particular component in place of the component having the manufacturing part number of "MPN1."

Every single change in inventory or supply chain status require that the production BOM file be edited and stored as a different production BOM file. As a result, delays in assembling the PCB occur until all the components needed to assemble the PCB according to the customer supplied-BOM and any customer-approved substitution components included in the AML have been received.

BRIEF DESCRIPTION OF THE DRAWINGS

Various embodiments of the invention are disclosed in the following detailed description and the accompanying drawings.

FIG. 2A is a block diagram illustrating a system for assembling a PCBA in accordance with some embodiments.

DETAILED DESCRIPTION

Figure 1:
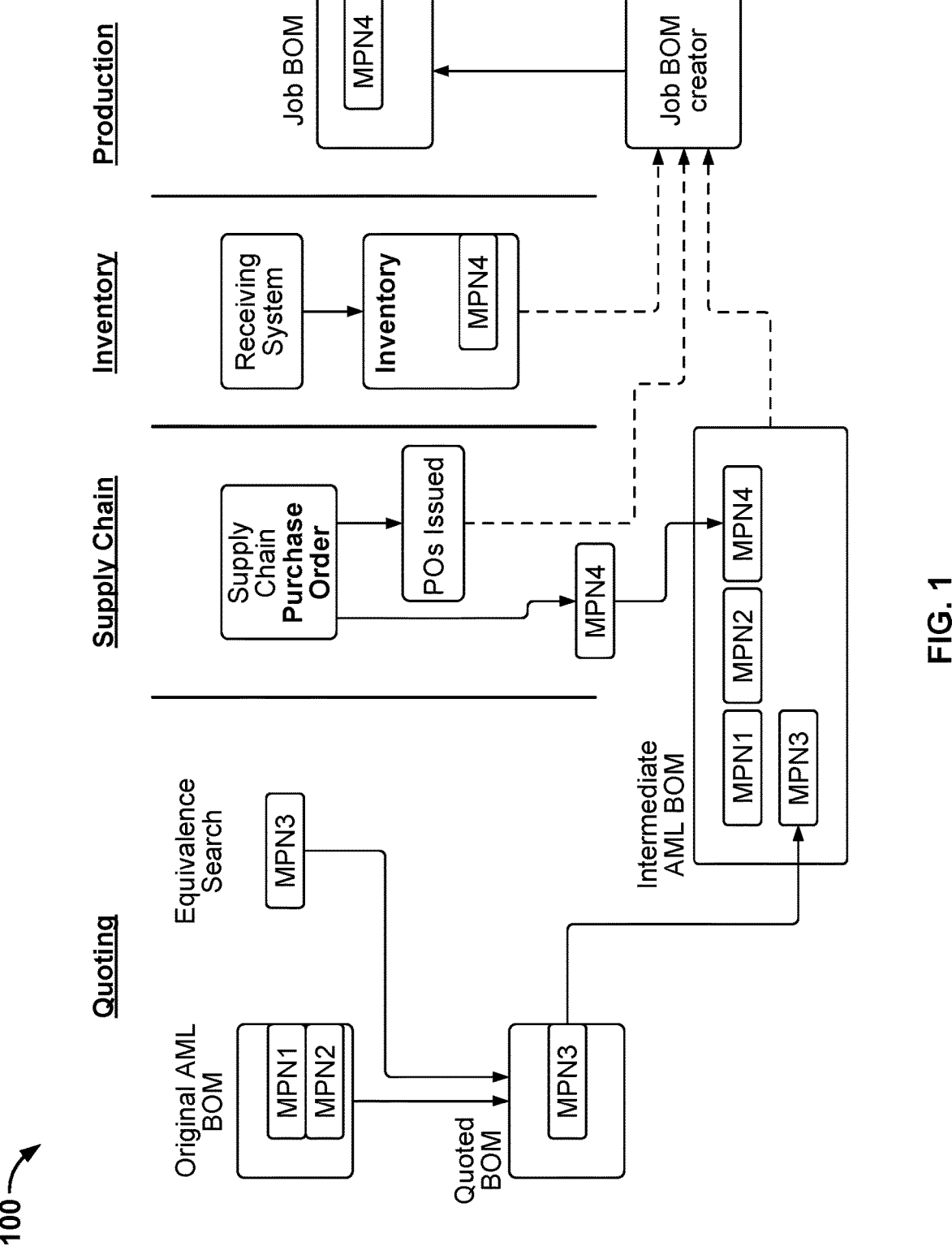
FIG. 1 is a diagram illustrating an example of a process for generating a production BOM.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to improve the assembly of a PCB is disclosed herein. A server receives from a client device via a network connection one or more files that include an initial BOM and an AML. The server accesses one or more databases associated with one or more suppliers and determines whether components included in the initial BOM are able to be obtained from any of the one or more suppliers. For each component included in the initial BOM, the server determines whether any of the suppliers can provide the component included in the initial BOM.

In some embodiments, for a particular component, a supplier can provide the specified quantity of the particular component specified in the initial BOM. In some embodiments, for a particular component, a supplier can provide some of the specified quantity of particular component specified in the initial BOM and one or more other suppliers can provide the remaining quantity of the particular component specified in the initial BOM. In some embodiments, a supplier cannot provide any of the specified quantity of the particular component specified in the initial BOM and one or more other suppliers can provide the remaining quantity of the particular component. In some embodiments, for a particular component, none of the suppliers can provide the specified quantity of the particular component specified in the initial BOM.

In response to a determination that a supplier is unable to provide a particular component, the server determines whether the supplier is able to provide a substitute component specified in the AML. In some embodiments, the supplier can provide the substitute component specified in the AML. In some embodiments, the supplier can provide the substitute component specified in the AML, but not in the numbers required by the initial BOM. In some embodiments, the suppliers are unable to provide the substitute component specified in the AML.

Other assemblers may wait until a supplier is able to provide the component specified in the initial BOM or a substitute component specified in the AML, however, waiting for such components to become available may lead to prolonged delays. Such delays may occur for some or all the components associated with the PCB. As a result, the PCB may not be able to be assembled within a time frame that is acceptable to the customer.

Using the disclosed technique, the server performs, for an unavailable component, an equivalence search to identify one or more components that may be substituted for a particular component specified in the initial BOM and not specified in the AML. The server sends to a client device associated with a customer a request to approve the use of the equivalent substitute component in the assembly of the PCB. The client device may provide the server a notification that use of the equivalent substitute component is approved.

In the example shown in FIG. 1, the initial BOM specified "MPN1" (manufacturer part number associated with a particular manufacturer) for a particular component and the customer provided AML listed "MPN2" as a substitute for the particular component. During the quoting phase, the server determined that neither "MPN1" nor "MPN2" were available at the time of quote, but determined "MPN3" to be an equivalent component for "MPN1." The server sends to a client device associated with the customer, a request to approve "MPN3" to be a substitute for "MPN1." In response to an approval, the server dynamically updates the initial BOM file to be an intermediate BOM file that includes components having an identifier of "MPN1," "MPN2," and "MPN3" as options for the particular component.

In response to an approval, in alternative embodiments, the server generates a new intermediate BOM file that includes components having an identifier of "MPN1," "MPN2," and "MPN3" as options for the particular component.

During the ordering phase, the server determined the component having the identifier "MPN3" was unavailable, but a supplier indicated that a component having the identifier "MPN4" is available as a substitute. The server sends to the client device associated with the customer, a request to approve "MPN4" to be a substitute for "MPN1." In response to an approval from a client device associated with the customer, the server updates the intermediate BOM file to include components having an identifier of "MPN1," "MPN2," "MPN3," and "MPN4" as options for the particular component and purchases the component having an identifier of "MPN4" from the supplier. The server may order a quantity of the equivalent substitute component of a BOM specified component that exceeds the quantity specified in the BOM for the BOM specified component due to supply chain delays and manufacturing attrition. Any unused equivalent substitute components may be stored and associated with the customer's general inventory bin for future use.

In response to an approval, in alternative embodiments, the server generates a new intermediate BOM file to include components having an identifier of "MPN1," "MPN2," "MPN3," and "MPN4" as options for the particular component and purchases the component having an identifier of "MPN4" from the supplier.

The server automatically updates an inventory data structure associated with the PCB in response to receiving the component. The inventory data structure associated with the PCB indicates the one or more components associated with the PCB that an assembler associated with the server has received. Upon receipt of the component, in some embodiments, the server automatically updates the intermediate BOM associated with the PCB. In some embodiments, the inventory data structure associated with the PCB is automatically updated upon scanning a barcode associated with a package that included the component. The component is assigned a unique identifier (UID). An indicator (e.g., a sticker, a label) with the UID is affixed to the package and stored at a corresponding storage location of the assembler's facility. The facility may include a plurality of storage racks, each storage rack including a plurality of bins. A bin may store one or more components. The inventory data structure associated with the PCB is updated to associate the UID with the corresponding storage location (e.g., the corresponding storage rack and corresponding storage bin). The intermediate BOM associated with the PCB may be automatically updated upon scanning a barcode associated with a package that included the component. The intermediate AML BOM may be updated to reflect the component(s) and the number of component(s) received in a package.

Upon receipt of the component, in alternative embodiments, the server automatically generates a new intermediate BOM associated with the PCB.

The intermediate BOM associated with the PCB includes a plurality of entries. Each entry may associate a particular component with a corresponding reference designator, a quantity of each component needed for the PCB and a breakdown of the quantity received for the component. For example, the intermediate BOM may indicate that 100 components are needed for a reference designator of "1." The entry may indicate that 25 components having an identifier of "MPN1," 25 components having an identifier of "MPN2," 25 components having an identifier of "MPN3," and "25 components having an identifier of "MPN4" have been received. In another example, all 100 components of MPN1 were ordered and received. The updated intermediate BOM may indicate that 100 of MPN1 were ordered and received.

A PCB is assembled into a PCBA using a production BOM. In some embodiments, the server analyzes the intermediate BOM associated with the PCB (e.g., the latest version) and the inventory data structure associated with the PCB after a package associated with the PCB has been scanned. In some embodiments, the server periodically (e.g., daily, weekly, etc.) analyzes the intermediate BOM associated with the PCB and the inventory data structure associated with the PCB. The server may analyze each entry of the intermediate BOM associated with the PCB to determine whether, for a particular component, the BOM specified quantity of the particular component or equivalent matches the quantity of the particular component and/or equivalent received (e.g., as indicated by the inventory data structure associated with the PCB). In response to a determination that at least one of the entries does not match (e.g., the specified quantity of a particular component or equivalent does not match the number of the particular component and/or equivalent received), the server is triggered by another condition (e.g., another component associated with the PCB being scanned into inventory or a particular amount of time passing) before re-analyzing the intermediate BOM associated with the PCB and the inventory data structure associated with the PCB. In response to a determination that all of the entries of the intermediate BOM associated with the PCB match (e.g., for each component, the BOM specified quantity of the particular component and/or equivalent matches the received quantity of the particular component and/or equivalent as indicated by the inventory data structure associated with the PCB or the intermediate BOM associated with the PCB), the server generates a production BOM associated with the PCB. The production BOM associated with the PCB specifies the plurality of components associated with the PCB to be assembled, a reference designator that indicates where on the PCB a corresponding component is to be located, and for each component: the specific component number(s) and corresponding quantities to be used.

Other systems may start with an initial BOM and generate a new production BOM each time there is a change order. Each change order has an associated delay cost. The production BOM indicates the components and associated quantities needed to assemble a PCB, but does not keep track of all of the different potential components that may be used for each component of a PCBA. That is, a component included in the initial BOM is overwritten with a substitute component. As a result, each time an PCBA assembler receives an order for one or more PCBAs, the PCBA assembler needs to repeat the process of starting with the initial BOM and generating one or more production BOMs until all of the components and associated quantities needed to assemble the PCB have been determined and received.

In contrast, the intermediate BOM provides a listing of all potential components that may be used for each component of a PCBA. The intermediate BOM is dynamically updated when there is a change order. Each time an PCBA assembler receives an order for one or more PCBAs, the components needed to assemble the PCB may be determined without having to start with the initial BOM and determining one or more substitute components because the one or more substitute components are already included in the intermediate BOM. In other words, the delay costs associated with change orders are reduced. As a result, the one or more PCBAs may be able to be assembled within a time frame that is acceptable to the customer.

Figure 2A:
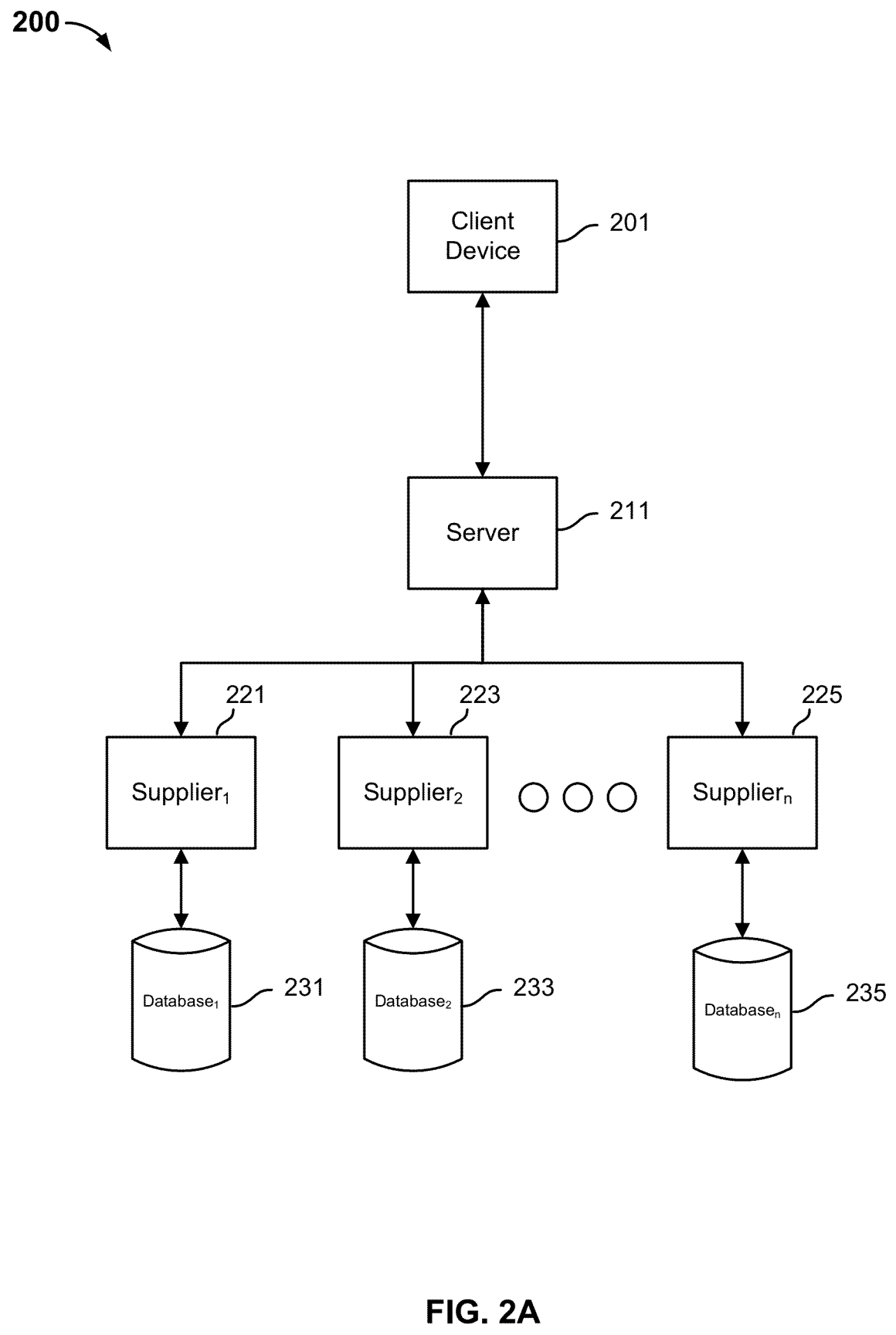

FIG. 2A is a block diagram illustrating a system for assembling a PCBA in accordance with some embodiments. In the example shown, client device 201 (e.g., a computer, a smartphone, a tablet, a server, a desktop, a laptop, etc.) is configured to communicate with server 211. Server 211 is configured to communicate with suppliers 221, 223, 225. Although FIG. 2A depicts server 211 being able to communicate with three suppliers, server 211 may communicate with 1:n suppliers. Suppliers 221, 223, 225 are associated with respective databases 231, 233, 235. Each database indicates an inventory associated with a supplier.

Figure 2B:
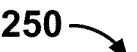
FIG. 2B is a flow diagram illustrating an embodiment of a process for assembling a PCBA in accordance with some embodiments.
Figure 2B:
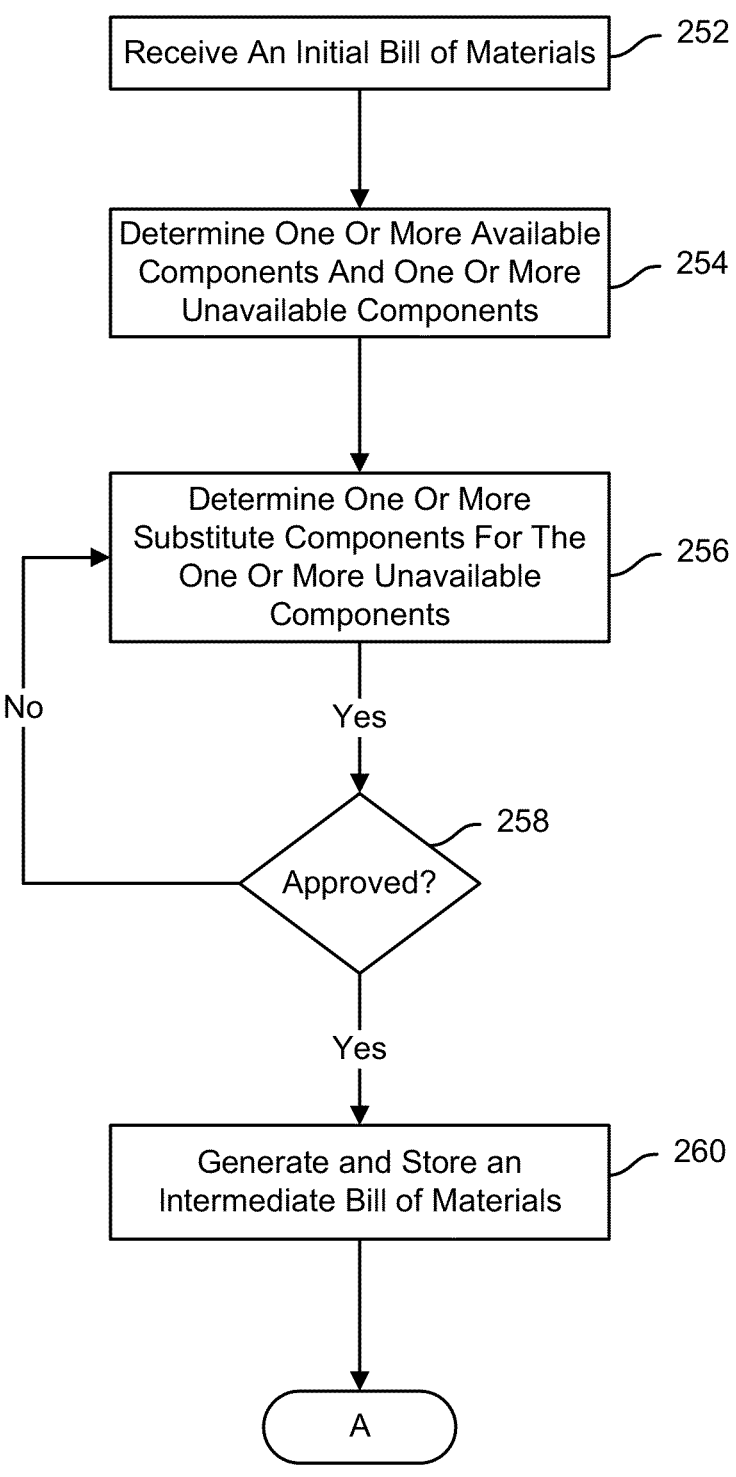
Figure 2B:
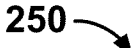
Figure 2B:
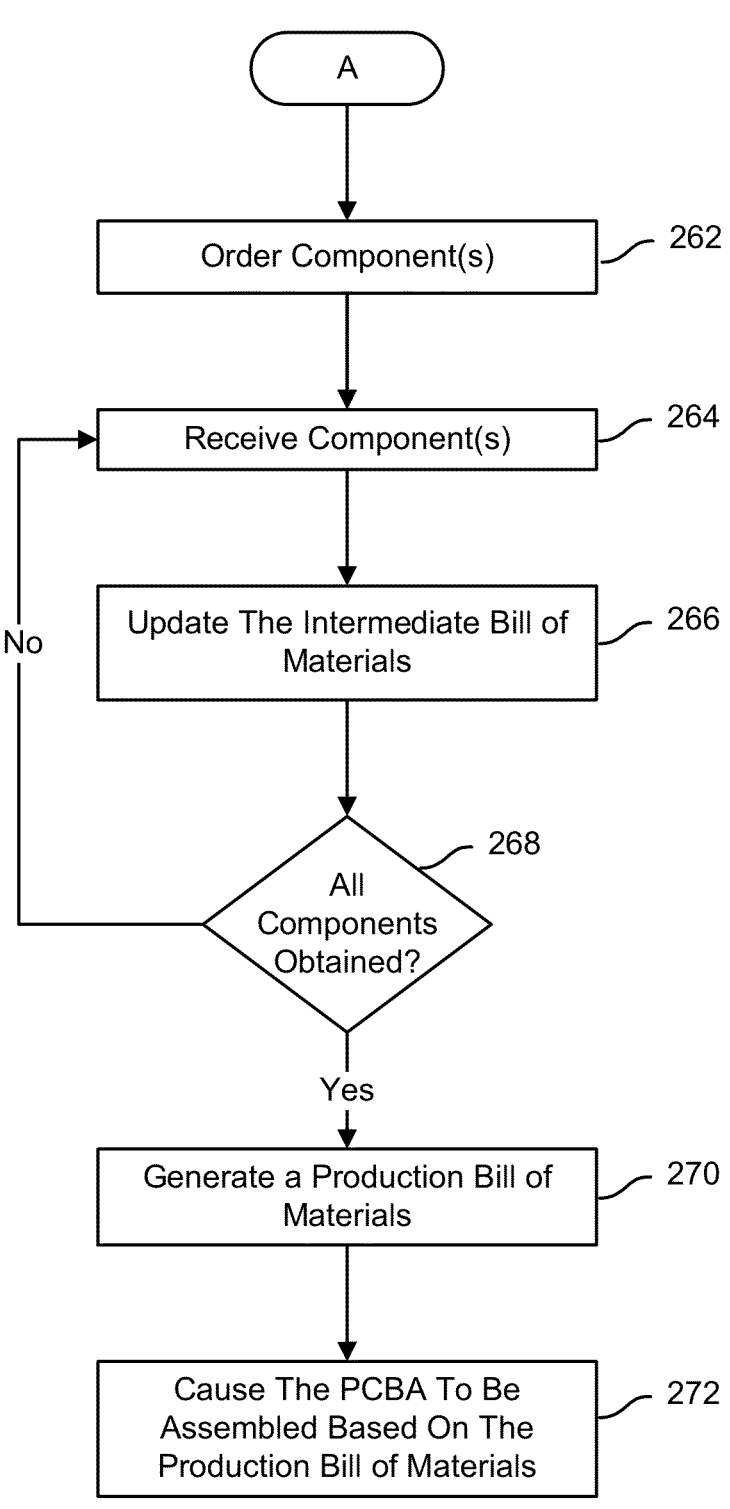

FIG. 2B is a flow diagram illustrating an embodiment of a process for assembling a PCBA in accordance with some embodiments. In the example shown, process 200 may be implemented by a server, such as server 211.

At 252, an initial bill of materials is received. The initial BOM is received from a client device associated with a customer. The initial BOM indicates a plurality of components associated with a PCB to be assembled, a reference designator that indicates where on the PCB a corresponding component is to be located, and a quantity of each component needed for the PCB. An AML may also be received from the client device associated with the customer. An AML indicates pre-approved substitution component(s) that may be used in the event a component included in the initial BOM is unavailable.

At 254, one or more available components and one or more unavailable components are identified. The server analyzes the initial BOM and the AML, accesses one or more databases associated with one or more suppliers, such as databases 231, 233, 235, to determine the one or more available components and the one or more unavailable components as well as the quantity the one or more suppliers are unable to provide. For each component included in the customer supplied BOM, the server determines whether any of the suppliers can provide the component included in the received BOM or the received AML.

In various embodiments, a component is listed in the BOM is available. In some embodiments, one or more suppliers may be able to provide a quantity of the available component that meets the quantity specified in the BOM. The server may order from the one or more suppliers the quantity of the available component that meets the quantity specified in the BOM. For example, the BOM may specify that 100 units of a first component are needed for the PCB and 100 units of the first component are available for order. The server may order 100 units of the first component from the one or more suppliers.

In various embodiments, one or more suppliers are able to provide a quantity of the available component that is less than the quantity specified in the BOM. The server may order from the one or more suppliers the quantity of the available component that is less than the quantity specified in the BOM. For example, the BOM may specify that 100 units of a second component are needed for the PCBA, but 50 units of the second component are available for order. The server may order 50 units of the second component from the one or more suppliers.

In various embodiments, one or more suppliers are able to provide a quantity of the available component that is more than the quantity specified in the BOM. Due to supply chain delays and/or manufacturing attrition, the server may order from the one or more suppliers a certain quantity of the available component in the event the quantity of the available component is more than the quantity specified in the BOM. In some embodiments, the certain quantity is a threshold quantity greater than the quantity specified in the BOM. In some embodiments, the certain quantity is a threshold percentage greater than the quantity specified in the BOM. Ordering more units of a component than needed may reduce delays associated with assembling the PCBA because extra units are available for use in the event manufacturing attrition occurs.

In various embodiments, a substitute component listed in the AML is available. In some embodiments, one or more suppliers are able to provide a quantity of the substitute component that meets the quantity specified in the BOM. The server may order from the one or more suppliers the quantity of the substitute component to meet the quantity specified in the BOM for a particular component. In some embodiments, one or more suppliers are able to provide a quantity of the substitute component that is less than the quantity specified in the BOM for a particular component. The server may order from the one or more suppliers the quantity of the substitute component that is less than the quantity specified in the BOM for the particular component. In some embodiments, one or more suppliers are able to provide a quantity of the substitute component that is more than the quantity specified in the BOM for the particular component. The server may order from the one or more suppliers a certain quantity of the substitute component in the event the quantity of the substitute component is more than the quantity specified in the BOM for the particular component due to supply chain delays and/or manufacturing attrition. In some embodiments, the certain quantity is a threshold quantity greater than the quantity specified in the BOM for the particular component. In some embodiments, the certain quantity is a threshold percentage greater than the quantity specified in the BOM for the particular component.

The PCBA assembler includes a plurality of storage racks. Each storage rack includes a plurality of bins. A customer may have a general inventory bin of components that are not assigned to a particular assembly job. The server may have ordered more quantities of a component than were needed for a particular assembly job and the excess components may be stored in the general inventory bin associated with the customer. A component may be available in the event the component is stored in a general inventory bin associated with the customer and not assigned to a particular assembly job.

After analyzing the BOM and the AML, the server identifies one or more unavailable components and a corresponding quantity for the one or more unavailable components. A component is unavailable in the event the quantity specified for the component in the BOM cannot be obtained using a combination of the BOM specified component and the AML specified substitute component. A component may be unavailable in the event some of the quantity specified for a particular component can be obtained from one or more suppliers using a combination of the BOM specified component and the AML specified substitute component. A component may be unavailable in the event none of the quantity specified for a particular component can be obtained from one or more suppliers using a combination of the BOM specified component and the AML specified substitute component.

At 256, one or more substitute components for the one or more unavailable components are determined. The server performs an equivalence search to specifically-identify one or more components that may be substituted for a particular component specified in the customer supplied BOM and not specified in the AML.

In some embodiments, a substitute component is selected to optimize the assembly process of the PCBA. For example, the BOM may specify a number of reels having a particular length (e.g., 5 reels, each reel 10 feet in length) to be used in the assembly process of the PCBA. Swapping out a used reel for a new reel may cause downtime in the assembly process. A substitute reel that is longer (e.g., 1 reel that is 50 feet in length) than the BOM specified reel may be identified. Utilizing the substitute reel in the assembly process may reduce the downtime in the assembly process because fewer reel swaps are required.

At 258, it is determined whether the one or more substitute components are approved. The server sends a request to a client device associated with a customer to approve the use of the substitute component in the assembly of the PCB. In response to a determination that the one or more substitute components are approved (e.g., the client device provides the server a notification that use of the substitute component is approved, process 250 proceeds to step 260. In response to a determination that one or more substitute components are not approved, process 250 returns to 256.

At 260, an intermediate bill of materials is generated and stored. In some embodiments, the intermediate BOM is an updated version of the customer provided BOM. In alternative embodiments, the intermediate BOM is a new data structure stored in a database or other type of data structure. The intermediate BOM includes the components specified in the customer provided BOM, the customer provided AML, and the one or more approved substitute components. The intermediate BOM may be stored in a database or a data structure.

At 262, component(s) are ordered. In some embodiments, a component corresponds to a component included in the original BOM. In some embodiments, a component corresponds to a component included in the AML.

In some embodiments, a component corresponds to a substitute component that is not included in the original BOM or AML. One or more suppliers may provide a quantity of the substitute component that meets the quantity specified in the BOM for a particular component. The server may order from the one or more suppliers the quantity of the substitute component to meet the quantity specified in the BOM for the particular component.

One or more suppliers may be able to provide a quantity of the substitute component that is less than the quantity specified in the BOM for a particular component. The server may order from the one or more suppliers the quantity of the substitute component that is less than the quantity specified in the BOM for the particular component.

One or more suppliers may be able to provide a quantity of the substitute component that is more than the quantity specified in the BOM for a particular component. The server may order from the one or more suppliers a certain quantity of the substitute component in the event the quantity of the substitute component is more than the quantity specified in the BOM for the particular component due to supply chain delays and/or manufacturing attrition. In some embodiments, the certain quantity is a threshold quantity greater than the quantity specified in the BOM for a particular component. In some embodiments, the certain quantity is a threshold percentage greater than the quantity specified in the BOM for a particular component.

At 264, component(s) are received. An inventory data structure associated with the PCB is automatically updated upon a barcode associated with a package that included the component being scanned. A component is assigned a corresponding UID. An indicator (e.g., a sticker, a label) with the UID is affixed to the package and stored at a corresponding storage location of the assembler's facility. The facility may include a plurality of storage racks, each storage rack including a plurality of bins. A bin may store one or more components. The inventory data structure associated with the PCB is updated to associate the UID with the corresponding storage location (e.g., the corresponding storage rack and corresponding storage bin).

At 266, the intermediate BOM is updated. The intermediate BOM associated with the PCB may be automatically updated upon a barcode associated with a package that included the component being scanned to reflect the component(s) and the number of component(s) received in a package.

At 268, it is determined whether all of the components associated with the intermediate BOM needed to assemble the PCB have been obtained. In response to a determination that all of the components associated with the intermediate BOM needed to assemble the PCB have been obtained, process 250 proceeds to step 270. In response to a determination that all of the components associated with the intermediate BOM needed to assemble the PCB have not been obtained, process 250 returns to step 264.

At 270, a production BOM associated with a PCB is generated. The production BOM associated with the PCB specifies the plurality of components associated with the PCB to be assembled, a reference designator that indicates where on the PCB a corresponding component is to be located, and for each component: the specific component number(s) and corresponding quantities to be used.

At 272, a PCBA is caused to be assembled based on the production BOM. Assembly of the PCB into a PCBA may commence after all of the components and corresponding quantities listed in the production BOM have been obtained. A notification may be provided to an assembler that the PCBA is ready to be assembled into the PCBA. In some embodiments, the assembler is a human assembler. In some embodiments, the assembler is a robotic system.

Figure 3:
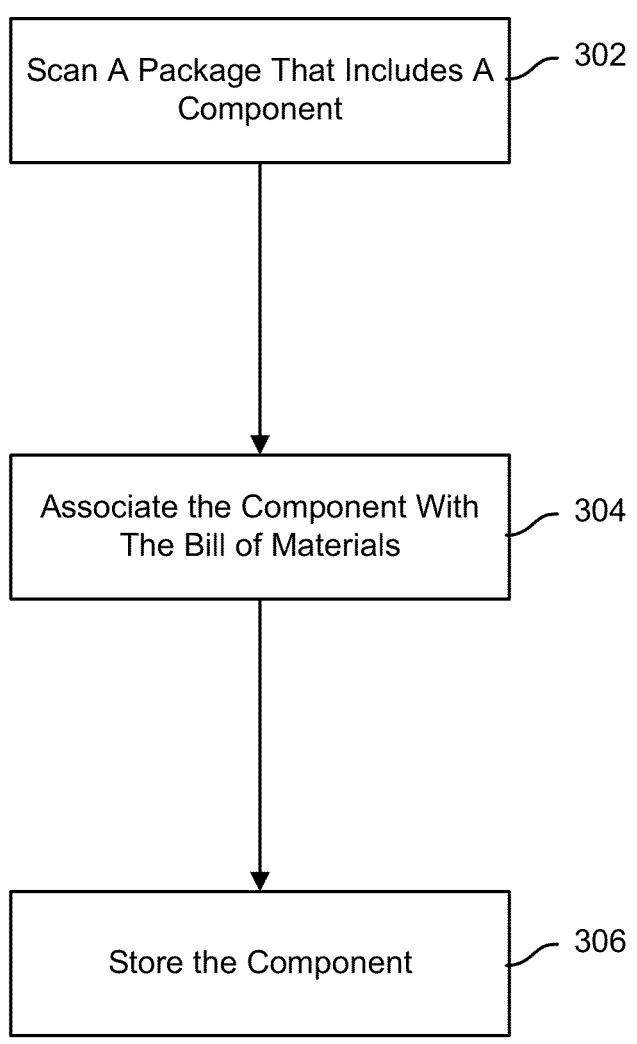
FIG. 3 is a flow diagram illustrating an embodiment of a process for receiving a component in accordance with some embodiments.

FIG. 3 is a flow diagram illustrating an embodiment of a process for receiving a component in accordance with some embodiments. In the example shown, process 300 may be implemented by a server, such as server 211. In some embodiments, process 300 is implemented to perform some or all of step 264 of process 200.

At 302, a package that includes a component is scanned.

At 304, the component is associated with a particular intermediate BOM. The component is assigned a UID and an inventory data structure associated with a PCB is updated to associate the UID with a corresponding storage location (e.g., a storage rack and storage bin). An indicator (e.g., a label or sticker) is affixed to the package that includes the component.

At 306, the component is stored. The package that includes the component is stored at the corresponding storage location.

Figure 4:
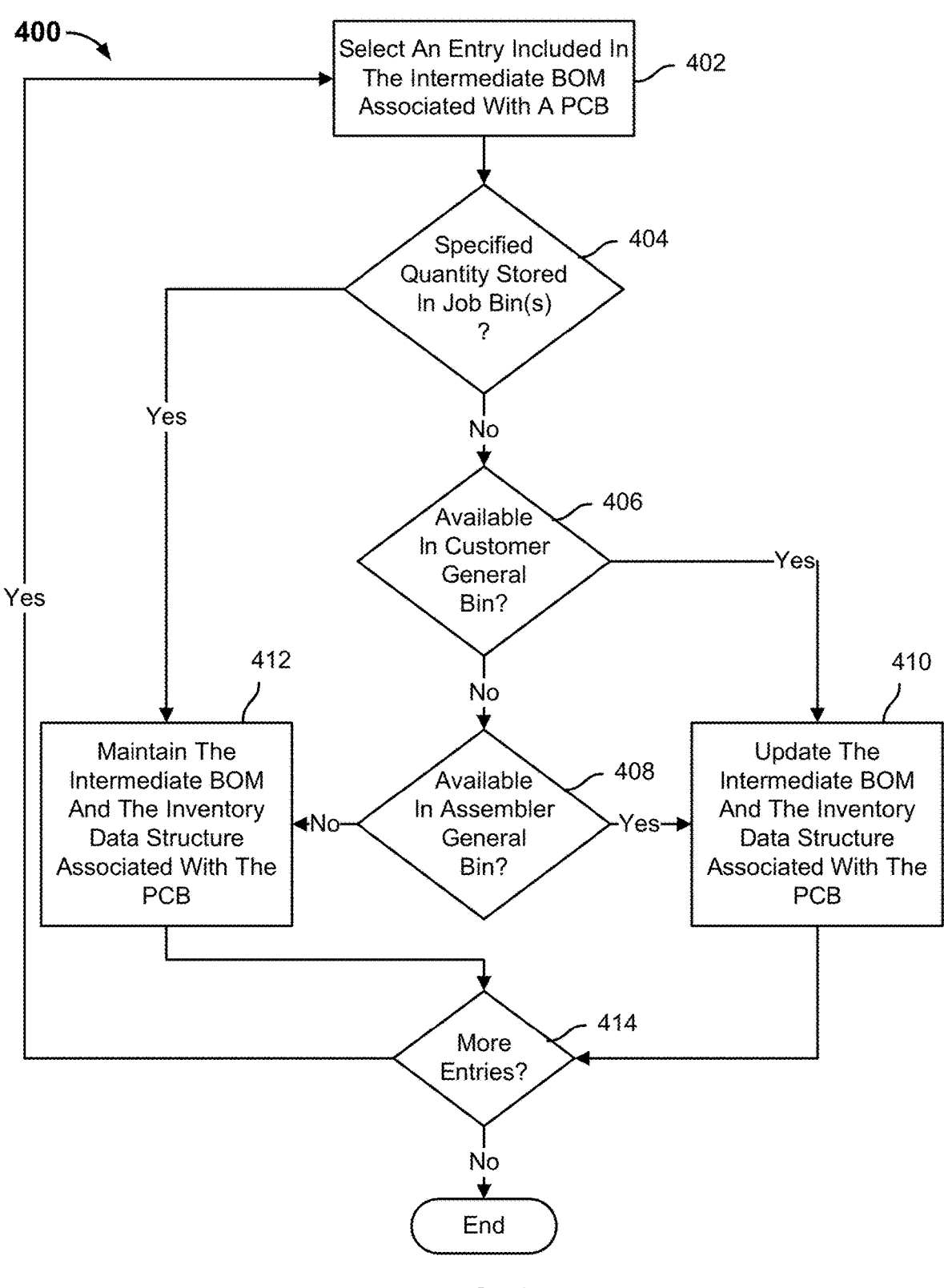
FIG. 4 is a flow diagram illustrating an embodiment of a process for determining whether all of the components associated with an intermediate BOM have been received in accordance with some embodiments.

FIG. 4 is a flow diagram illustrating an embodiment of a process for determining whether all of the components associated with an intermediate BOM have been received in accordance with some embodiments. In the example shown, process 400 may be implemented by a server, such as server 211. In some embodiments, process 400 is implemented to perform some or all of steps 268 of process 250. In some embodiments, process 400 is implemented to perform some or all of steps 618 of process 600.

At 402, an entry included in the intermediate BOM associated with a PCB is selected. An entry corresponds a component specified in the intermediate BOM associated with the PCB. The component specified in the intermediate BOM associated with the PCB may correspond to a component specified in the initial BOM, a component specified in the customer provided AML, and/or a substitute component (e.g., a substitute component identified at step 256). The entry may specify a corresponding quantity for a component specified in the initial BOM, a component specified in the customer provided AML, and/or a substitute component.

At 404, it is determined whether the specified quantity is stored in bin(s) specific to the assembly job. The server may analyze the intermediate BOM associated with the PCB to determine the specified quantity for the component and the inventory data structure associated with the PCBA to determine a corresponding location for the component.

In response to a determination that the specified quantity is stored in bin(s) specific to the assembly job, process 400 proceeds to 414. In response to a determination that the specified quantity is not stored bin(s) specific for the job, process 400 proceeds to 406.

At 406, it is determined whether the component is available in a general bin associated with the customer. The customer may have ordered an extra quantity of the component for a previous job due to supply chain delays and manufacturing attrition. The unused components associated with the previous job may be stored in a general bin associated with the customer. Components stored in the general bin associated with the customer may be used to avoid delays in the supply chain.

A customer may have a plurality of job specific bins. A component associated with a different job may not be used to manufacture a current job.

In response to a determination that the component is not available in the general bin associated with the customer, process 400 proceeds to 408. In response to a determination that the component is available in the general bin associated with the customer, process 400 proceeds to 410.

At 408, it is determined whether the component is available in a general bin associated with an assembler. The assembler may have a general bin that includes spare parts that can be used for any customer job. In response to a determination that the component is not available in a general bin associated with an assembler, process 400 proceeds to 412. In response to a determination that the component is available in the general bin associated with the assembler, process 400 proceeds to 410.

At 410, the intermediate BOM and the inventory data structure associated with the PCB are updated. In some embodiments, the intermediate BOM associated with the PCB is updated to include a quantity of the component that is stored in the customer's general bin. The intermediate BOM associated with the PCB is updated to include a quantity of the component that is stored in the assembler's general bin. The inventory data structure associated with the PCB is updated to reflect the corresponding storage location for the component (e.g., the customer's general bin or the assembler's general bin) and quantity stored at the corresponding storage location.

At 412, the intermediate BOM and the inventory data structure associated with the PCB are maintained.

At 414, it is determined whether there are any more entries in the intermediate BOM associated with the PCB to analyze. In response to a determination that there is at least one remaining entry in the intermediate BOM associated with the PCB to analyze, process 400 returns to 402. In response to a determination that there are no more entries in the intermediate BOM associated with the PCB to analyze, process 400 ends.

Figure 5:
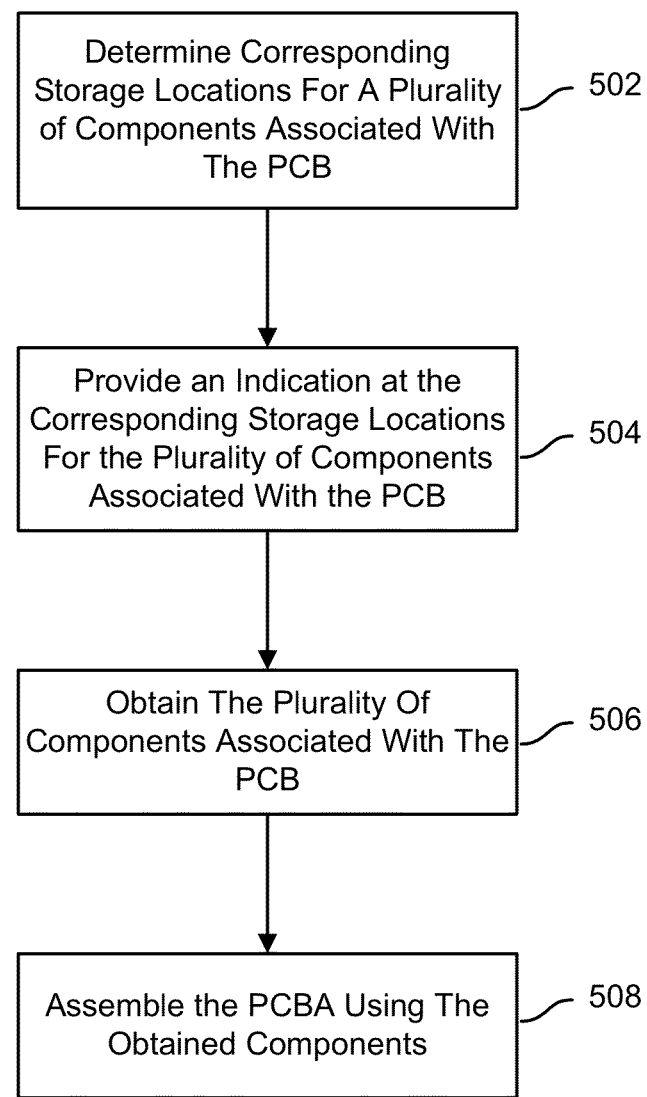
FIG. 5 is a flow diagram illustrating an embodiment of a process for assembling a PCBA in accordance with some embodiments.

FIG. 5 is a flow diagram illustrating an embodiment of a process for assembling a PCBA in accordance with some embodiments. In some embodiments, process 500 is implemented by a server, such as server 211. In some embodiments, process 500 is implemented to perform some or all of step 272 of process 250. In some embodiments, process 500 is implemented to perform some or all of step 622 of process 600.

At 502, corresponding storage locations for a plurality of components associated with the PCB are determined. The inventory data structure associated with the PCBA is analyzed to determine the corresponding storage locations.

At 504, an indication at the corresponding storage locations for the plurality of components associated with the PCB is provided. The facility includes a plurality of storage racks, each storage rack including a plurality of storage bins. Each storage bin includes an associated indicator (e.g., an LED light). The corresponding indicator of the one or more storage bins storing the components associated with the PCB may be turned on to notify a gatherer. This enables the gatherer to easily identify the location(s) of the PCB components.

At 508, the plurality of components associated with the PCB is obtained. In some embodiments, the plurality of components associated with the PCB is obtained by a human. In some embodiments, the plurality of components associated with the PCB is obtained by a robotic system.

At 510, the PCBA is assembled using the obtained components. In some embodiments, the PCBA is manufactured by a human. In some embodiments, the PCBA is manufactured by a robotic system.

Figure 6:
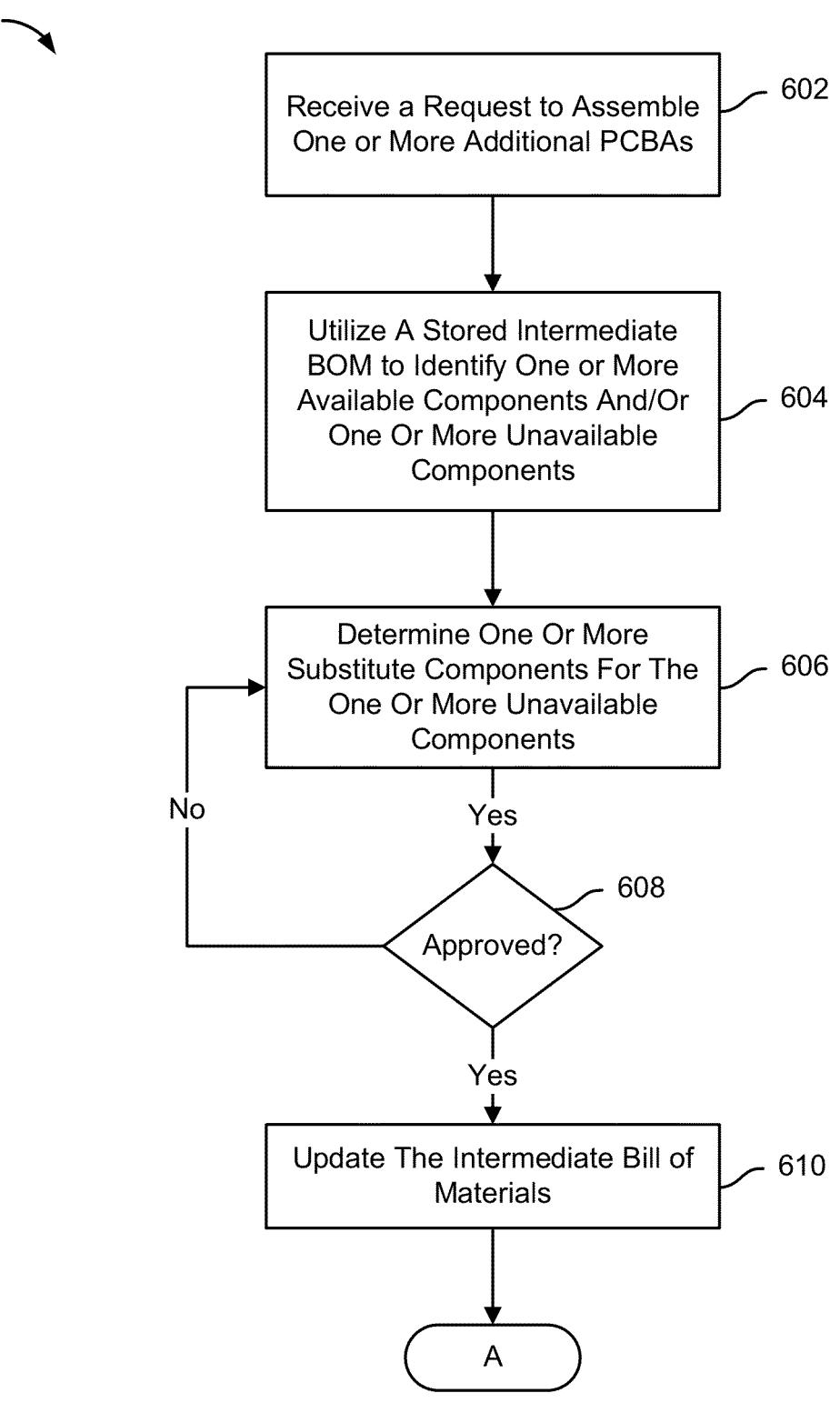
FIG. 6 is a flow diagram illustrating an embodiment of a process for assembling one or more additional PCBAs.
Figure 6:
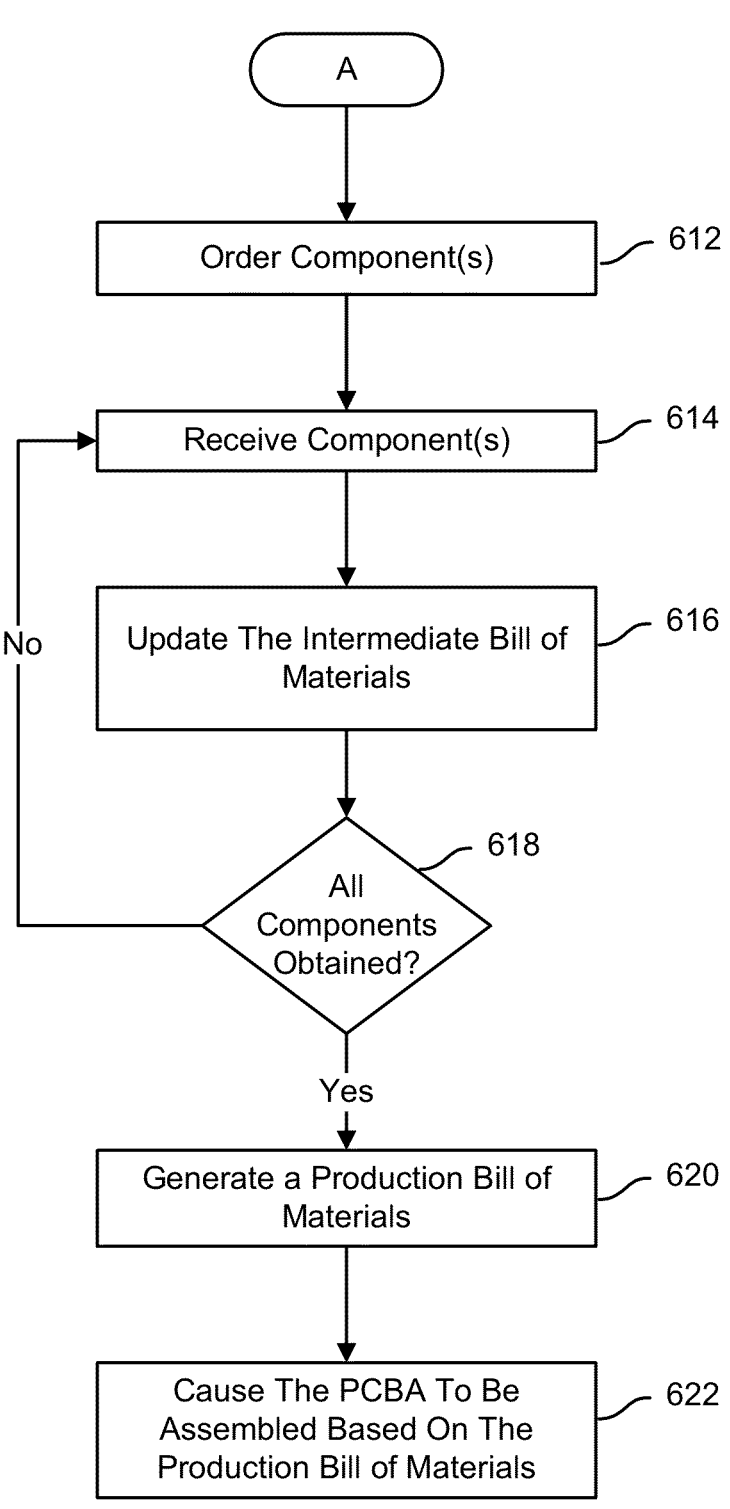

FIG. 6 is a flow diagram illustrating an embodiment of a process for assembling one or more additional PCBAs. In the example shown, process 600 may be implemented by a server, such as server 211.

At 602, a request to assemble one or more additional PCBAs is received. A client device associated with a previous customer may send the request to assemble one or more additional PCBAs associated with a design.

At 604, a stored intermediate BOM associated with the design is utilized to identify one or more available components and/or one or more unavailable components. The components that were used to assemble one or more previous PCBAs associated with the design may not be available at the time of the request. The initial BOM provided by the previous customer does not include one or more substitute components determined at step 256 of process 250.

Other systems may manufacture the one or more additional PCBAs by using the initial BOM and AML. However, there may be delays in the assembly of the one or more additional PCBAs because the other systems are limited to the components listed in the initial BOM and AML. In contrast, components listed in the stored intermediate BOM include components separate from the initial BOM and AML in addition to the components listed in the initial BOM and AML, and have already been approved by the previous customer. As a result, delays in the manufacturing process stemming from obtaining customer approval for a substitute component are reduced.

In some embodiments, the components listed in the intermediate BOM are available. An available component may correspond to a component listed in the initial BOM, the customer provided AML, or a component identified in step 256 of process 250.

In some embodiments, at least one of the components listed in the intermediate BOM is unavailable.

At 606, one or more substitute components for one or more unavailable components are determined. The server performs an equivalence search to specifically identify one or more components that may be substituted for a particular component specified in the intermediate BOM.

At 608, it is determined whether the one or more substitute components are approved. The server sends a request to a client device associated with a customer to approve the use of the substitute component in the assembly of the PCBA. In response to a determination that the one or more substitute components are approved (e.g., the client device provides the server a notification that use of the substitute component is approved), process 600 proceeds to step 610. In response to a determination that one or more substitute components are not approved, process 600 returns to 606.

At 610, an intermediate bill of materials is generated and stored. In some embodiments, the intermediate BOM is an updated version of the customer provided BOM. In alternative embodiments, the intermediate BOM is a new data structure stored in a database or other type of data structure. The intermediate BOM includes the components specified in the customer provided BOM, the customer provided AML, and the one or more approved substitute components.

In some embodiments, steps 606, 608, and 610 are optional. For example, all the components listed in the intermediate BOM needed to assemble the PCBA are available.

At 612, component(s) are ordered. In some embodiments, a component corresponds to a component included in the customer provided BOM. In some embodiments, a component corresponds to a component included in the AML. In some embodiments, a component corresponds to a substitute component (a substitute component associated with a previous intermediate BOM or a substitute component associated with a current intermediate BOM).

At 614, component(s) are received. An inventory data structure associated with the PCBA is automatically updated upon scanning a barcode associated with a package that included the component. The component(s) are assigned a UID. An indicator (e.g., a sticker) with the UID is affixed to the package and stored at a corresponding storage location of the assembler's facility. The facility may include a plurality of storage racks, each storage rack including a plurality of bins. A bin may store one or more components. The inventory data structure associated with the PCB is updated to associate the UID with the corresponding storage location (e.g., the corresponding storage rack and corresponding storage bin).

At 616, the intermediate bill of materials is updated. The intermediate BOM associated with the PCB may be automatically updated upon scanning a barcode associated with a package that included the component to reflect the component(s) and the number of component(s) received in a package.

At 618, it is determined whether all of the components associated with the bill of materials have been obtained. In response to a determination that all of the components associated with the bill of materials have been obtained, process 600 proceeds to step 620. In response to a determination that all of the components associated with the intermediate BOM have not been obtained, process 600 returns to step 614.

At 620, a production BOM is generated. The production BOM associated with the PCB specifies the plurality of components associated with the PCB to be assembled, a reference designator that indicates where on the PCB a corresponding component is to be located, and for each component: the specific component number(s) and corresponding quantities to be used. The production BOM for the one or more additional PCBAs may be different than the production BOM used for one or more previous PCBAs even though they both being used to manufacture the same device design.

At 622, a PCBA is assembled based on the production bill of materials.

Figure 7:
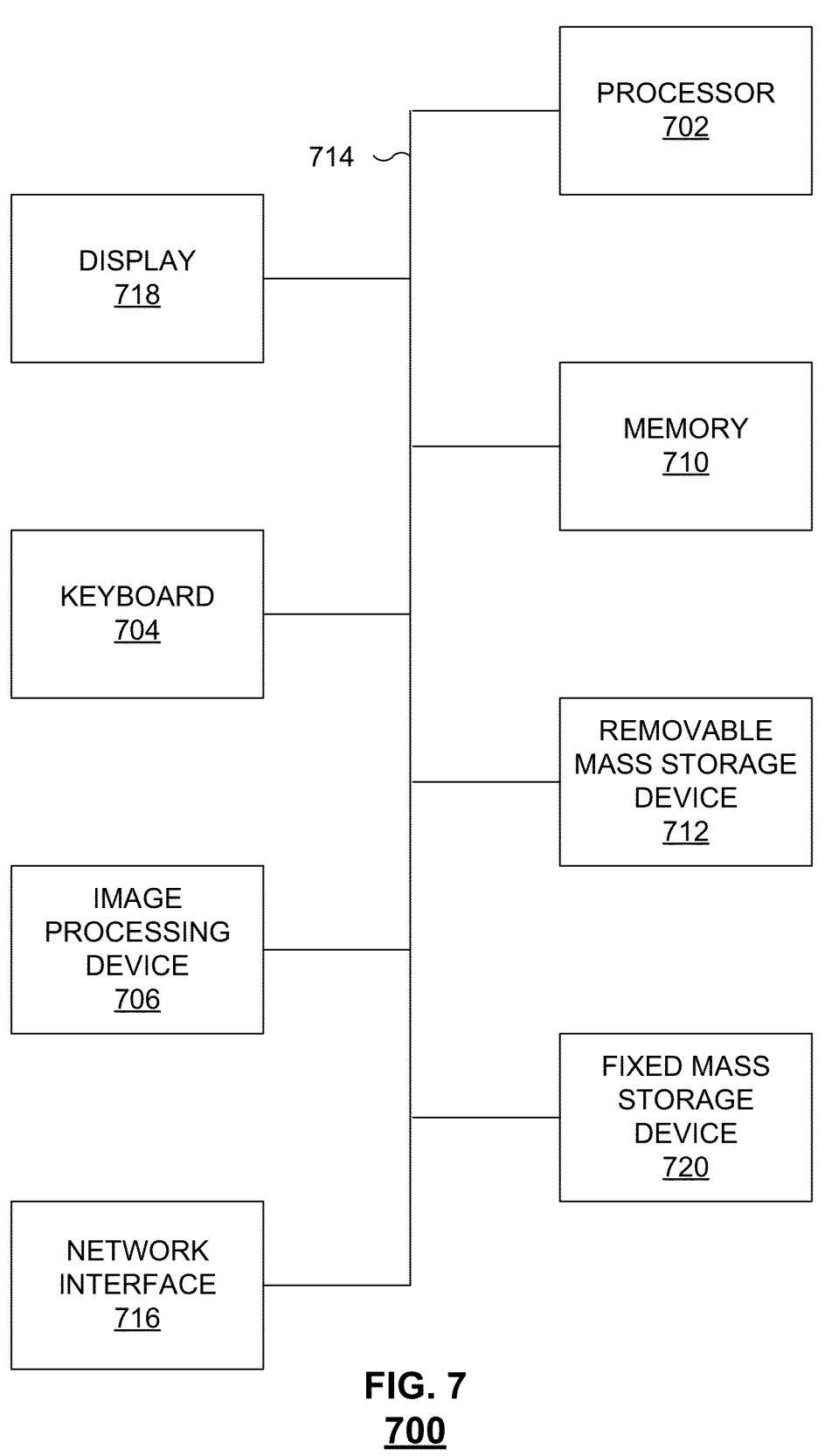
FIG. 7 is a functional diagram illustrating a server for generating a production BOM in accordance with some embodiments.

FIG. 7 is a functional diagram illustrating a server for generating a production BOM in accordance with some embodiments. As will be apparent, other server architectures and configurations can be used to perform the described product generation technique. Server 700, which includes various subsystems as described below, includes at least one microprocessor subsystem (also referred to as a processor or a central processing unit (CPU) 702). For example, processor 702 can be implemented by a single-chip processor or by multiple processors. In some embodiments, processor 702 is a general purpose digital processor that controls the operation of the server 700. In some embodiments, processor 702 also includes one or more coprocessors or special purpose processors (e.g., a graphics processor, a network processor, etc.). Using instructions retrieved from memory 710, processor 702 controls the reception and manipulation of input data received on an input device (e.g., image processing device 706, I/O device interface 704), and the output and display of data on output devices (e.g., display 718).

Processor 702 is coupled bi-directionally with memory 710, which can include, for example, one or more random access memories (RAM) and/or one or more read-only memories (ROM). As is well known in the art, memory 710 can be used as a general storage area, a temporary (e.g., scratch pad) memory, and/or a cache memory. Memory 710 can also be used to store input data and processed data, as well as to store programming instructions and data, in the form of data objects and text objects, in addition to other data and instructions for processes operating on processor 702. Also as is well known in the art, memory 710 typically includes basic operating instructions, program code, data, and objects used by the processor 702 to perform its functions (e.g., programmed instructions). For example, memory 710 can include any suitable computer readable storage media described below, depending on whether, for example, data access needs to be bi-directional or uni-directional. For example, processor 702 can also directly and very rapidly retrieve and store frequently needed data in a cache memory included in memory 710.

A removable mass storage device 712 provides additional data storage capacity for the server 700, and is optionally coupled either bi-directionally (read/write) or uni-directionally (read only) to processor 702. A fixed mass storage 720 can also, for example, provide additional data storage capacity. For example, storage devices 712 and/or 720 can include computer readable media such as magnetic tape, flash memory, PC-CARDS, portable mass storage devices such as hard drives (e.g., magnetic, optical, or solid state drives), holographic storage devices, and other storage devices. Mass storages 712 and/or 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can be used to provide access to other subsystems and devices as well. As shown, these can include a display 718, a network interface 716, an input/output (I/O) device interface 704, an image processing device 706, as well as other subsystems and devices. For example, image processing device 706 can include a camera, a scanner, etc.; I/O device interface 704 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 700. Multiple I/O device interfaces can be used in conjunction with server 700. The I/O device interface can include general and customized interfaces that allow the processor 702 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 716 allows processor 702 to be coupled to another computer, one or more robotic systems, computer network, a network of storage bins, or telecommunications network using a network connection as shown. For example, through the network interface 716, the processor 702 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the server 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

In addition, various embodiments disclosed herein further relate to computer storage products with a computer readable medium that includes program code for performing various computer-implemented operations. The computer readable medium includes any data storage device that can store data which can thereafter be read by a server. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The server shown in FIG. 7 is but an example of a server suitable for use with the various embodiments disclosed herein. Other servers suitable for such use can include additional or fewer subsystems. In some servers, subsystems can share components (e.g., for touchscreen-based devices such as smart phones, tablets, etc., I/O device interface 704 and display 718 share the touch sensitive screen component, which both detects user inputs and displays outputs to the user). In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a communication interface configured to receive an initial bill of materials (BOM) and an alternative manufacturing list (AML) to assemble a printed circuit board; and a processor coupled to the communication interface and configured to:

generate and store in a database, an intermediate BOM that includes, for each of one or more components comprising the printed circuit board, one or more corresponding specifically-identified parts approved to be used for the one or more components;

update the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically update an inventory data structure associated with the printed circuit board responsive to a barcode of the component associated with the intermediate BOM being scanned and determine based on the intermediate BOM whether a plurality of components needed to assemble the printed circuit board have been obtained, wherein the received component is a substitute component not specified in the initial BOM, but specified in the AML, wherein to determine whether the plurality of components needed to assemble the printed circuit board have been obtained, the processor is configured to select an entry corresponding to a component specified in the intermediate BOM and determine whether a specified quantity is stored in one or more bins specific to an assembly job associated with the printed circuit board, wherein in response to a determination that the specified quantity is not stored in the one or more bins specific to the assembly job associated with the printed circuit board, the processor is configured to determine whether the component specified in the intermediate BOM is available in a general bin associated with a customer of the printed circuit board, wherein in response to a determination that the component specified in the intermediate BOM is available in a general bin associated with a customer of the printed circuit board, the processor is configured to update the intermediate BOM to include a quantity of the component that is stored in the general bin associated with the customer of the printed circuit board;

update the inventory data structure associated with the printed circuit board to associate the received component with a corresponding storage location;

determine that the plurality of components needed to assemble the printed circuit board have been obtained;

in response to a determination that the plurality of components needed to assemble the printed circuit board have been obtained, generate a production BOM that is based on a latest version of the intermediate BOM; and cause the printed circuit board to be assembled using the plurality of components according to the production BOM including by obtaining using a robotic system the plurality of components associated with the printed circuit board based on the corresponding storage location for each component of the plurality of components.

2. The system of claim 1, wherein the one or more corresponding specifically-identified parts approved to be used for the one or more components are included in the initial BOM.

3. The system of claim 1, wherein the one or more corresponding specifically-identified parts approved to be used for the one or more components are included in the AML.

4. The system of claim 1, wherein the one or more corresponding specifically-identified parts approved to be used for the one or more components are determined by performing an equivalence search of the one or more components comprising the printed circuit board.

5. The system of claim 1, wherein the processor is configured to update the intermediate BOM to add the one or more specifically-identified parts not included in the initial BOM or the AML in response to receiving an approval via the communication interface.

6. The system of claim 1, wherein in response to a determination that the specified quantity is stored in the one or more bins specific to the assembly job associated with the printed circuit board, the processor is configured to maintain the intermediate BOM.

7. The system of claim 1, wherein in response to a determination that the component specified in the intermediate BOM is not available in a general bin associated with a customer of the printed circuit board, the processor is configured to determine whether the component specified in the intermediate BOM is available in a general bin associated with an assembler of the printed circuit board.

8. A system, comprising:

a communication interface configured to receive an initial bill of materials (BOM) and an alternative manufacturing list (AML) to assemble a printed circuit board; and a processor coupled to the communication interface and configured to:

generate and store in a database, an intermediate BOM that includes, for each of one or more components comprising the printed circuit board, one or more corresponding specifically-identified parts approved to be used for the one or more components;

update the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically update an inventory data structure associated with the printed circuit board responsive to a barcode of the component associated with the intermediate BOM being scanned and determine based on the intermediate BOM whether a plurality of components needed to assemble the printed circuit board have been obtained, wherein the received component is a substitute component not specified in the initial BOM, but specified in the AML, wherein to determine whether the plurality of components needed to assemble the printed circuit board have been obtained, the processor is configured to select an entry corresponding to a component specified in the intermediate BOM and determine whether a specified quantity is stored in one or more bins specific to an assembly job associated with the printed circuit board, wherein in response to a determination that the specified quantity is not stored in the one or more bins specific to the assembly job associated with the printed circuit board, the processor is configured to determine whether the component specified in the intermediate BOM is available in a general bin associated with a customer of the printed circuit board, wherein in response to a determination that the component specified in the intermediate BOM is not available in a general bin associated with a customer of the printed circuit board, the processor is configured to determine whether the component specified in the intermediate BOM is available in a general bin associated with an assembler of the printed circuit board, wherein in response to a determination that the component specified in the intermediate BOM is available in the general bin associated with the assembler of the printed circuit board, the processor is configured to update the intermediate BOM to include a quantity of the component that is stored in the general bin associated with the assembler of the printed circuit board;

update the inventory data structure associated with the printed circuit board to associate the received component with a corresponding storage location;

determine that the plurality of components needed to assemble the printed circuit board have been obtained;

in response to a determination that the plurality of components needed to assemble the printed circuit board have been obtained, generate a production BOM that is based on a latest version of the intermediate BOM; and cause the printed circuit board to be assembled using the plurality of components according to the production BOM including by obtaining using a robotic system the plurality of components associated with the printed circuit board based on the corresponding storage location for each component of the plurality of components.

9. A system, comprising:

a communication interface configured to receive an initial bill of materials (BOM) and an alternative manufacturing list (AML) to assemble a printed circuit board; and a processor coupled to the communication interface and configured to:

generate and store in a database, an intermediate BOM that includes, for each of one or more components comprising the printed circuit board, one or more corresponding specifically-identified parts approved to be used for the one or more components;

update the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically update an inventory data structure associated with the printed circuit board responsive to a barcode of the component associated with the intermediate BOM being scanned and determine based on the intermediate BOM whether a plurality of components needed to assemble the printed circuit board have been obtained, wherein the received component is a substitute component not specified in the initial BOM, but specified in the AML, wherein to determine whether the plurality of components needed to assemble the printed circuit board have been obtained, the processor is configured to select an entry corresponding to a component specified in the intermediate BOM and determine whether a specified quantity is stored in one or more bins specific to an assembly job associated with the printed circuit board, wherein in response to a determination that the specified quantity is not stored in the one or more bins specific to the assembly job associated with the printed circuit board, the processor is configured to determine whether the component specified in the intermediate BOM is available in a general bin associated with a customer of the printed circuit board, wherein in response to a determination that the component specified in the intermediate BOM is not available in a general bin associated with a customer of the printed circuit board, the processor is configured to determine whether the component specified in the intermediate BOM is available in a general bin associated with an assembler of the printed circuit board, wherein in response to a determination that the component specified in the intermediate BOM is not available in the general bin associated with the assembler of the printed circuit board, the processor is configured to maintain the intermediate BOM;

update the inventory data structure associated with the printed circuit board to associate the received component with a corresponding storage location;

determine that the plurality of components needed to assemble the printed circuit board have been obtained;

in response to a determination that the plurality of components needed to assemble the printed circuit board have been obtained, generate a production BOM that is based on a latest version of the intermediate BOM; and cause the printed circuit board to be assembled using the plurality of components according to the production BOM including by obtaining using a robotic system the plurality of components associated with the printed circuit board based on the corresponding storage location for each component of the plurality of components.

10. The system of claim 1, wherein the communication interface is configured to receive a request to assemble one or more additional printed circuit boards and the processor is configured to use the stored intermediate BOM to generate a production BOM associated with the one or more additional printed circuit boards.

11. The system of claim 10, wherein at least one component included in the production BOM associated with the one or more additional printed circuit boards is different than a production BOM associated with the printed circuit board.

12. A method, comprising:

receiving an initial bill of materials (BOM) and an alternative manufacturing list (AML) to assemble a printed circuit board;

generating and storing in a database, an intermediate BOM that includes, for each of one or more components comprising the printed circuit board, one or more corresponding specifically-identified parts approved to be used for the one or more components;

updating the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically updating an inventory data structure associated with the printed circuit board responsive to a barcode of the component associated with the intermediate BOM being scanned and determining based on the intermediate BOM whether a plurality of components needed to assemble the printed circuit board have been obtained, wherein the received component is a substitute component not specified in the initial BOM, but specified in the AML;

to determine whether the plurality of components needed to assemble the printed circuit board have been obtained, selecting an entry corresponding to a component specified in the intermediate BOM and determining whether a specified quantity is stored in one or more bins specific to an assembly job associated with the printed circuit board;

in response to a determination that the specified quantity is not stored in the one or more bins specific to the assembly job associated with the printed circuit board, determining whether the component specified in the intermediate BOM is available in a general bin associated with a customer of the printed circuit board;

in response to a determination that the component specified in the intermediate BOM is available in a general bin associated with a customer of the printed circuit board, updating the intermediate BOM to include a quantity of the component that is stored in the general bin associated with the customer of the printed circuit board;

updating the inventory data structure associated with the printed circuit board to associate the received component with a corresponding storage location;

determining that the plurality of components needed to assemble the printed circuit board have been obtained;

in response to a determination that the plurality of components needed to assemble the printed circuit board have been obtained, generating a production BOM that is based on a latest version of the intermediate BOM; and causing the printed circuit board to be assembled using the plurality of components according to the production BOM including by obtaining using a robotic system the plurality of components associated with the printed circuit board based on the corresponding storage location for each component of the plurality of components.

13. The method of claim 12, wherein the one or more corresponding specifically-identified parts approved to be used for the one or more components are determined by performing an equivalence search of the one or more components comprising the printed circuit board.

14. A computer program product embodied in a non-transitory computer readable medium and comprising computer instructions for:

receiving an initial bill of materials (BOM) and an alternative manufacturing list (AML) to assemble a printed circuit board;

generating and storing in a database, an intermediate BOM that includes, for each of one or more components comprising the printed circuit board, one or more corresponding specifically-identified parts approved to be used for the one or more components;

updating the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically updating an inventory data structure associated with the printed circuit board responsive to a barcode of the component associated with the intermediate BOM being scanned and determining based on the intermediate BOM whether a plurality of components needed to assemble the printed circuit board have been obtained, wherein the received component is a substitute component not specified in the initial BOM, but specified in the AML;

to determine whether the plurality of components needed to assemble the printed circuit board have been obtained, selecting an entry corresponding to a component specified in the intermediate BOM and determining whether a specified quantity is stored in one or more bins specific to an assembly job associated with the printed circuit board;

in response to a determination that the specified quantity is not stored in the one or more bins specific to the assembly job associated with the printed circuit board, determining whether the component specified in the intermediate BOM is available in a general bin associated with a customer of the printed circuit board;

in response to a determination that the component specified in the intermediate BOM is available in a general bin associated with a customer of the printed circuit board, updating the intermediate BOM to include a quantity of the component that is stored in the general bin associated with the customer of the printed circuit board;

updating the inventory data structure associated with the printed circuit board to associate the received component with a corresponding storage location;

determining that the plurality of components needed to assemble the printed circuit board have been obtained;

in response to a determination that the plurality of components needed to assemble the printed circuit board have been obtained, generating a production BOM that is based on a latest version of the intermediate BOM; and causing the printed circuit board to be assembled using the plurality of components according to the production BOM including by obtaining using a robotic system the plurality of components associated with the printed circuit board based on the corresponding storage location for each component of the plurality of components.

15. A method, comprising:

receiving an initial bill of materials (BOM) and an alternative manufacturing list (AML) to assemble a printed circuit board;

generating and storing in a database, an intermediate BOM that includes, for each of one or more components comprising the printed circuit board, one or more corresponding specifically-identified parts approved to be used for the one or more components;

updating the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically updating an inventory data structure associated with the printed circuit board responsive to a barcode of the component associated with the intermediate BOM being scanned and determining based on the intermediate BOM whether a plurality of components needed to assemble the printed circuit board have been obtained, wherein the received component is a substitute component not specified in the initial BOM, but specified in the AML;

to determine whether the plurality of components needed to assemble the printed circuit board have been obtained, selecting an entry corresponding to a component specified in the intermediate BOM and determining whether a specified quantity is stored in one or more bins specific to an assembly job associated with the printed circuit board;

in response to a determination that the specified quantity is not stored in the one or more bins specific to the assembly job associated with the printed circuit board, determining whether the component specified in the intermediate BOM is available in a general bin associated with a customer of the printed circuit board;

in response to a determination that the component specified in the intermediate BOM is not available in a general bin associated with a customer of the printed circuit board, determining whether the component specified in the intermediate BOM is available in a general bin associated with an assembler of the printed circuit board;

in response to a determination that the component specified in the intermediate BOM is available in the general bin associated with the assembler of the printed circuit board, updating the intermediate BOM to include a quantity of the component that is stored in the general bin associated with the assembler of the printed circuit board;

updating the inventory data structure associated with the printed circuit board to associate the received component with a corresponding storage location;

determining that the plurality of components needed to assemble the printed circuit board have been obtained;

in response to a determination that the plurality of components needed to assemble the printed circuit board have been obtained, generating a production BOM that is based on a latest version of the intermediate BOM; and causing the printed circuit board to be assembled using the plurality of components according to the production BOM including by obtaining using a robotic system the plurality of components associated with the printed circuit board based on the corresponding storage location for each component of the plurality of components.

16. A computer program product embodied in a non-transitory computer readable medium and comprising computer instructions for:

receiving an initial bill of materials (BOM) and an alternative manufacturing list (AML) to assemble a printed circuit board;

generating and storing in a database, an intermediate BOM that includes, for each of one or more components comprising the printed circuit board, one or more corresponding specifically-identified parts approved to be used for the one or more components;

updating the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically updating an inventory data structure associated with the printed circuit board responsive to a barcode of the component associated with the intermediate BOM being scanned and determining based on the intermediate BOM whether a plurality of components needed to assemble the printed circuit board have been obtained, wherein the received component is a substitute component not specified in the initial BOM, but specified in the AML;

to determine whether the plurality of components needed to assemble the printed circuit board have been obtained, selecting an entry corresponding to a component specified in the intermediate BOM and determining whether a specified quantity is stored in one or more bins specific to an assembly job associated with the printed circuit board;

in response to a determination that the specified quantity is not stored in the one or more bins specific to the assembly job associated with the printed circuit board, determining whether the component specified in the intermediate BOM is available in a general bin associated with a customer of the printed circuit board;

in response to a determination that the component specified in the intermediate BOM is not available in a general bin associated with a customer of the printed circuit board, determining whether the component specified in the intermediate BOM is available in a general bin associated with an assembler of the printed circuit board;

in response to a determination that the component specified in the intermediate BOM is available in the general bin associated with the assembler of the printed circuit board, updating the intermediate BOM to include a quantity of the component that is stored in the general bin associated with the assembler of the printed circuit board;

updating the inventory data structure associated with the printed circuit board to associate the received component with a corresponding storage location;

determining that the plurality of components needed to assemble the printed circuit board have been obtained;

in response to a determination that the plurality of components needed to assemble the printed circuit board have been obtained, generating a production BOM that is based on a latest version of the intermediate BOM; and causing the printed circuit board to be assembled using the plurality of components according to the production BOM including by obtaining using a robotic system the plurality of components associated with the printed circuit board based on the corresponding storage location for each component of the plurality of components.

17. A method, comprising:

receiving an initial bill of materials (BOM) and an alternative manufacturing list (AML) to assemble a printed circuit board;

generating and storing in a database, an intermediate BOM that includes, for each of one or more components comprising the printed circuit board, one or more corresponding specifically-identified parts approved to be used for the one or more components;

updating the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically updating an inventory data structure associated with the printed circuit board responsive to a barcode of the component associated with the intermediate BOM being scanned and determining based on the intermediate BOM whether a plurality of components needed to assemble the printed circuit board have been obtained, wherein the received component is a substitute component not specified in the initial BOM, but specified in the AML;

to determine whether the plurality of components needed to assemble the printed circuit board have been obtained, selecting an entry corresponding to a component specified in the intermediate BOM and determining whether a specified quantity is stored in one or more bins specific to an assembly job associated with the printed circuit board;

in response to a determination that the specified quantity is not stored in the one or more bins specific to the assembly job associated with the printed circuit board, determining whether the component specified in the intermediate BOM is available in a general bin associated with a customer of the printed circuit board;

in response to a determination that the component specified in the intermediate BOM is not available in a general bin associated with a customer of the printed circuit board, determining whether the component specified in the intermediate BOM is available in a general bin associated with an assembler of the printed circuit board;

in response to a determination that the component specified in the intermediate BOM is not available in the general bin associated with the assembler of the printed circuit board, maintaining the intermediate BOM;

updating the inventory data structure associated with the printed circuit board to associate the received component with a corresponding storage location;

determining that the plurality of components needed to assemble the printed circuit board have been obtained;

in response to a determination that the plurality of components needed to assemble the printed circuit board have been obtained, generating a production BOM that is based on a latest version of the intermediate BOM; and causing the printed circuit board to be assembled using the plurality of components according to the production BOM including by obtaining using a robotic system the plurality of components associated with the printed circuit board based on the corresponding storage location for each component of the plurality of components.

18. A computer program product embodied in a non-transitory computer readable medium and comprising computer instructions for:

receiving an initial bill of materials (BOM) and an alternative manufacturing list (AML) to assemble a printed circuit board;

generating and storing in a database, an intermediate BOM that includes, for each of one or more components comprising the printed circuit board, one or more corresponding specifically-identified parts approved to be used for the one or more components;

updating the intermediate BOM to add one or more specifically-identified parts not included in the initial BOM or the AML, based at least in part on a determination that a specifically-identified part listed in the initial BOM or the AML is unavailable;

in response to receiving a component associated with the intermediate BOM, automatically updating an inventory data structure associated with the printed circuit board responsive to a barcode of the component associated with the intermediate BOM being scanned and determining based on the intermediate BOM whether a plurality of components needed to assemble the printed circuit board have been obtained, wherein the received component is a substitute component not specified in the initial BOM, but specified in the AML;

to determine whether the plurality of components needed to assemble the printed circuit board have been obtained, selecting an entry corresponding to a component specified in the intermediate BOM and determining whether a specified quantity is stored in one or more bins specific to an assembly job associated with the printed circuit board;

in response to a determination that the specified quantity is not stored in the one or more bins specific to the assembly job associated with the printed circuit board, determining whether the component specified in the intermediate BOM is available in a general bin associated with a customer of the printed circuit board;

in response to a determination that the component specified in the intermediate BOM is not available in a general bin associated with a customer of the printed circuit board, determining whether the component specified in the intermediate BOM is available in a general bin associated with an assembler of the printed circuit board;

in response to a determination that the component specified in the intermediate BOM is not available in the general bin associated with the assembler of the printed circuit board, maintaining the intermediate BOM;

updating the inventory data structure associated with the printed circuit board to associate the received component with a corresponding storage location;

determining that the plurality of components needed to assemble the printed circuit board have been obtained;

in response to a determination that the plurality of components needed to assemble the printed circuit board have been obtained, generating a production BOM that is based on a latest version of the intermediate BOM; and causing the printed circuit board to be assembled using the plurality of components according to the production BOM including by obtaining using a robotic system the plurality of components associated with the printed circuit board based on the corresponding storage location for each component of the plurality of components.

* * * * *